(12) United States Patent
Walder

(10) Patent No.: US 8,289,698 B1
(45) Date of Patent: Oct. 16, 2012

(54) INTEGRATED DOCKING STATION

(75) Inventor: Traci Danielle Walder, Spotsylvania, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 78 days.

(21) Appl. No.: 12/925,391

(22) Filed: Sep. 29, 2010

(51) Int. Cl.
*G06F 1/16* (2006.01)
*H05K 5/00* (2006.01)
*H05K 7/00* (2006.01)

(52) U.S. Cl. .................................. 361/679.41; 439/374

(58) Field of Classification Search ............. 361/679.41, 361/679.55, 679.01, 679.02, 679.4–679.45; 439/374; 710/303
See application file for complete search history.

(56) References Cited

U.S. PATENT DOCUMENTS

| | | | |
|---|---|---|---|
| 5,369,549 A * | 11/1994 | Kopp et al. ................... 312/263 |
| 6,091,602 A * | 7/2000 | Helot ....................... 361/679.44 |
| 6,179,122 B1 * | 1/2001 | Moncrief et al. ............. 206/320 |
| 6,185,095 B1 | 2/2001 | Helot et al. ................... 361/686 |
| 6,301,103 B1 * | 10/2001 | Abboud ..................... 361/679.6 |
| 6,400,561 B1 * | 6/2002 | Horton ...................... 361/679.58 |
| 6,490,154 B2 * | 12/2002 | Thompson ............... 361/679.41 |
| 6,626,686 B1 * | 9/2003 | D'Souza et al. ............. 439/131 |
| 6,643,127 B1 * | 11/2003 | Richardson ................ 361/679.4 |
| 6,646,866 B2 * | 11/2003 | Kao .......................... 361/679.26 |
| 6,726,295 B2 * | 4/2004 | Searby ....................... 312/223.2 |
| 6,781,825 B2 * | 8/2004 | Shih et al. ................. 361/679.58 |
| 6,896,134 B2 * | 5/2005 | Russell et al. ................ 206/320 |
| 7,088,578 B1 * | 8/2006 | Gruby et al. ............. 361/679.56 |
| 7,236,863 B2 * | 6/2007 | LaPorte et al. ................... 701/36 |
| 7,298,611 B1 | 11/2007 | Carnevali ...................... 361/683 |
| 7,324,333 B2 * | 1/2008 | Allen ....................... 361/679.55 |
| 7,573,707 B2 | 8/2009 | Kuo .......................... 361/679.41 |
| 7,663,879 B2 * | 2/2010 | Richardson et al. ..... 361/679.56 |
| 7,684,185 B2 * | 3/2010 | Farrugia ................... 361/679.41 |
| 7,688,580 B2 * | 3/2010 | Richardson et al. ..... 361/679.56 |
| 7,755,890 B2 * | 7/2010 | Rui et al. ................. 361/679.55 |
| 7,843,686 B2 * | 11/2010 | McEwan et al. ......... 361/679.55 |
| 7,907,394 B2 * | 3/2011 | Richardson et al. ....... 361/679.3 |
| 7,983,027 B2 * | 7/2011 | Lord ........................ 361/679.02 |
| 2003/0184958 A1 * | 10/2003 | Kao ............................. 361/683 |
| 2009/0009945 A1 * | 1/2009 | Johnson et al. ............... 361/681 |

OTHER PUBLICATIONS

Panasonic Cradles & Docking Stations http://www.gamberjohnson.com/pdf/request_quote_1.1/07_panasonic_solutions.pdf.
Gamber Johnson brochure http://pcsmobile.blueboltlive.com/Portals/0/docs/Spec%20Sheets/panasonic%20compatibility%20trifold.pdf.

* cited by examiner

*Primary Examiner* — Adrian S Wilson
(74) *Attorney, Agent, or Firm* — Gerhard W. Thielman, Esq.

(57) ABSTRACT

A docking station is provided for a laptop computer that has access to at least one connector and at least one push button. The docking station includes upper and lower portions. The upper portion has an aft bridge, a starboard arm and a port arm, each the arm having a lip, at least one of the arms having at least one cavity through a top surface for correspondently receiving the push button, and at least one of the arms having at least one orifice for correspondently receiving the connector. The lower portion has an aft spine, a starboard side, a front spine and a port side that bound a base. The computer can be disposed on the base. The lower portion includes front plates at corners to the starboard and port sides. The upper portion is disposed on the lower portion such that each lip aligns to the corresponding plate. The upper and lower portions are secured by mechanical fasteners, such as screws.

8 Claims, 3 Drawing Sheets

INTEGRATED DOCKING STATION

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to integrated docking stations. In particular, the invention relates to ruggedized docking stations for encapsulating a military-grade laptop computer.

The majority of weapons systems require controls for executing computer operations and mechanical commands. This can be accomplished with a computer docking station with appropriate interface devices.

SUMMARY

Conventional docking stations yield disadvantages addressed by various exemplary embodiments of the present invention. In particular, various exemplary embodiments provide a docking station for a laptop computer that has access to at least one connector and at least one push button. The docking station includes upper and lower portions.

The upper portion has an aft bridge, a starboard arm and a port arm, each the arm having a lip, at least one of the arms having at least one cavity through a top surface for correspondently receiving the push button, and at least one of the arms having at least one orifice for correspondently receiving the connector. The lower portion has an aft spine, a starboard side, a front spine and a port side that bound a base.

The computer can be disposed on the base. The lower portion includes front plates at corners to the starboard and port sides. The upper portion is disposed on the lower portion such that each lip aligns to the corresponding plate. The upper and lower portions are secured by mechanical fasteners, such as screws.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

A conventional docking station has been developed, but this has not satisfied requirements regarding safety and reliability for weapon system operation. The conventional docking station demonstrated susceptibility to the minor shock and vibration, thereby causing the weapon system to shut down. In addition, the conventional docking station lacked environmental seals or accessibility to facilitate maintenance, and could not be reconfigured for alternate mission objectives. In order to simplify the operation of the weapon system, an integrated docking station (IDS) is required. The station provides the operator with a single hand held device for operating the weapon system.

The Naval Surface Warfare Center Dahlgren Division (NSWCDD) Integrated Docking Station (IDS) is an aluminum 14.5 in×10.5 in enclosure for the CF-19 Toughdock computer that enables integration of various weapons systems using gun fire control switches while maintaining target control access through the CF-19. The IDS is environmentally sealed and satisfies all military specifications (Mil-Spec), providing external access for a universal serial bus (USB), Ethernet, and power using Mil-Spec connectors.

The overall design has been ruggedized in order to prolong the operational life of the product, as has been demonstrated analytically by computational structural analysis and empirically by drop tests. Various configurations for the gun-fire control switches have been implemented in order to provide cross-program integration of this system.

Figure 1:
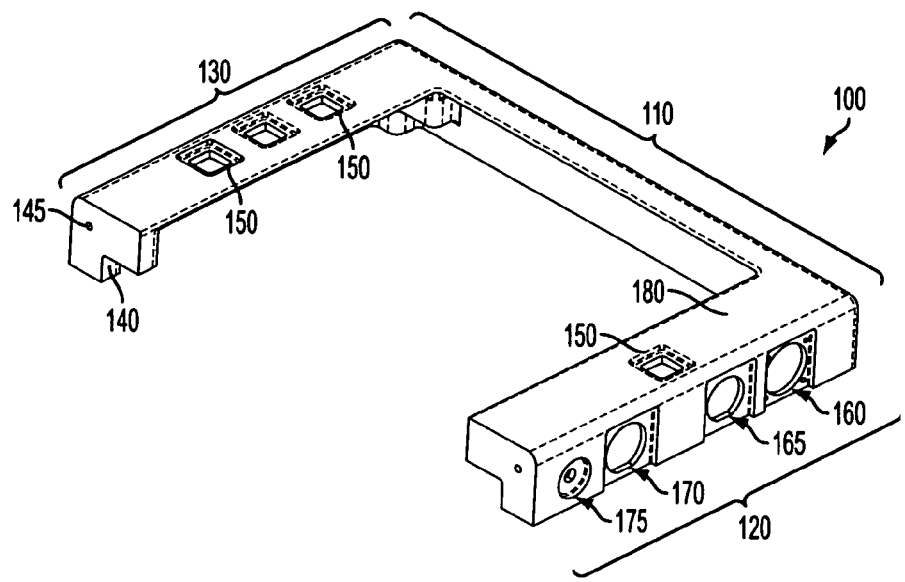
FIG. 1 is an isometric view of an upper portion.

FIG. 1 shows an isometric view of an upper portion 100 of the IDS. A top aft bridge 110 connects a top starboard arm 120 and a top port arm 130. Both arms 120 and 130 terminate opposite the bridge 110 at entrance lips 140 that enable alignment of the CF-19 Toughdock (shown as 310 in FIG. 3). Screwholes 145 in the lips 140 provide attachment access. Four square access portholes 150 are disposed along the top surfaces of arms: one on the starboard arm 120 and three on the port arm 130. These portholes 150 can be assigned to conditional command functions, including trigger, arming and misfire.

Round access ports 160, 165, 170 and 175 (of various sizes) are disposed along the lateral edge of the starboard arm 120. The first round porthole 160 provides for an Ethernet cable jack that connects internally to the Toughdock. The second round porthole 160 provides the USB connection for the Toughdock. The third round porthole 170 provides for a trigger access associated with the porthole 150 on the starboard arm 120. The fourth round port 175 provides an access for a power supply that recharges an internal battery of the Toughdock. A top surface 180 of the bridge 110 and the arms 120, 130 represents the upper extremity of the upper portion 100 at which the portholes 150 emerge. Near the corners of the bridge 110 are holes (not shown) from a bottom surface opposite the top surface 180.

Figure 2:
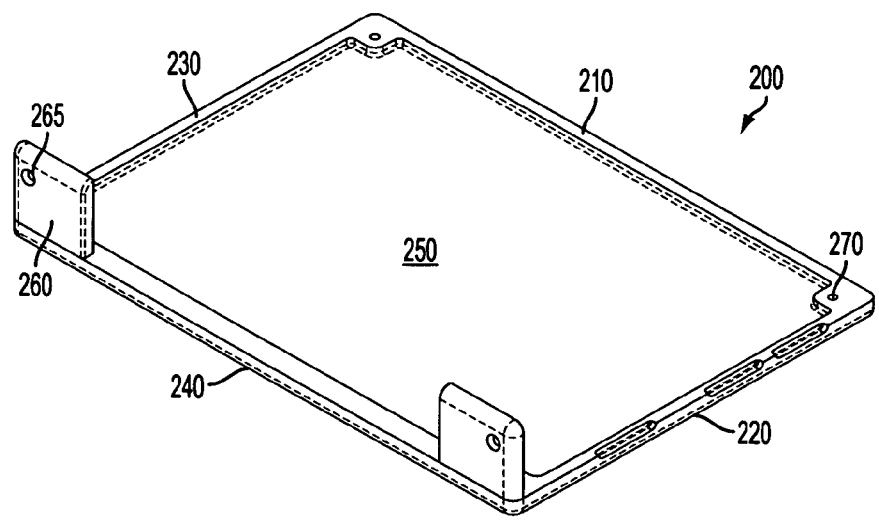
FIG. 2 is an isometric view of a lower portion.

FIG. 2 shows an isometric view of a lower portion 200 of the IDS. The portion 200 includes an aft spine 210, a starboard side 220, a port side 230 and a front spine 240 that enclose a base plate 250 on which the Toughdock can be disposed. A pair of front plates 260 extends perpendicular from the front spine 240, such that the plates 260 are vertical relative to the base plate 250 being horizontal. The plates 260 include screw holes 265 that align with their corresponding counterpart holes 145 on the upper portion 100. Additional screw holes 270 are disposed at the corners of the aft spine 210 that correspond to the counterpart holes at the corners of the aft bridge 110.

Figure 3:
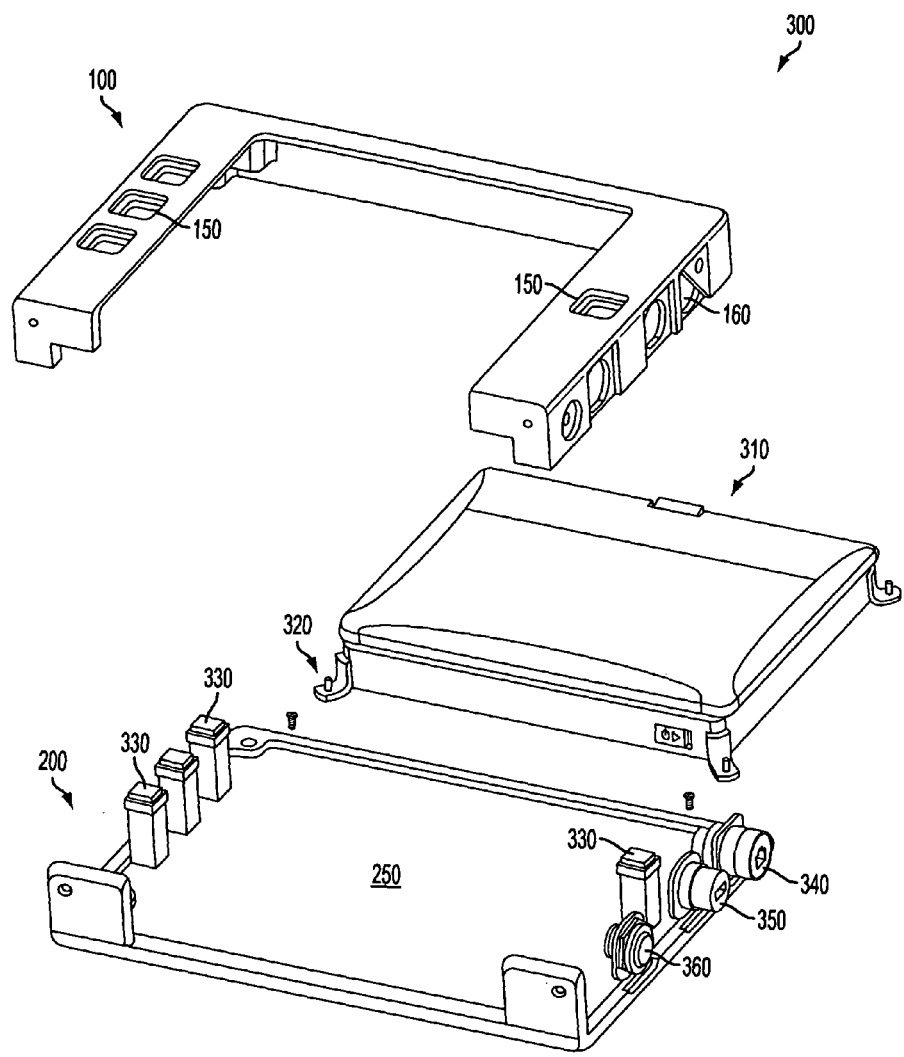
FIG. 3 is an isometric exploded view of a docking station.

FIG. 3 shows an isometric exploded view 300 of the complete IDS. The upper and lower portions 100, 200 sandwich a CF-19 Toughdock computer 310 to be disposed on the base plate 250. At each corner of the Toughdock 310 is disposed an L-shape foot 320 corresponding to the screw holes 270 for securing the IDS portions together. Gun-fire push buttons 330 suspend downward into the enclosure from the corresponding portholes 150 on the arms 120 and 130 upon assembly. Optionally, the portholes 150 can be covered by a metal plate for configurations that do not require all four buttons 330.

An Ethernet Mighty Mouse connector 340 provides an Ethernet cable plug for the Toughdock 310 and protrudes through the porthole 160. A USB Mighty Mouse connector 350 provides a USB plug for the Toughdock 310 and protrudes through the porthole 165. A command port Might Mouse connector 360 protrudes through the porthole 170 and provides external access for the buttons 330 that operate trigger, arming and misfire commands. The connector 360 also enables the operator to connect to an external weapons system into the Toughdock 310.

Figure 4:
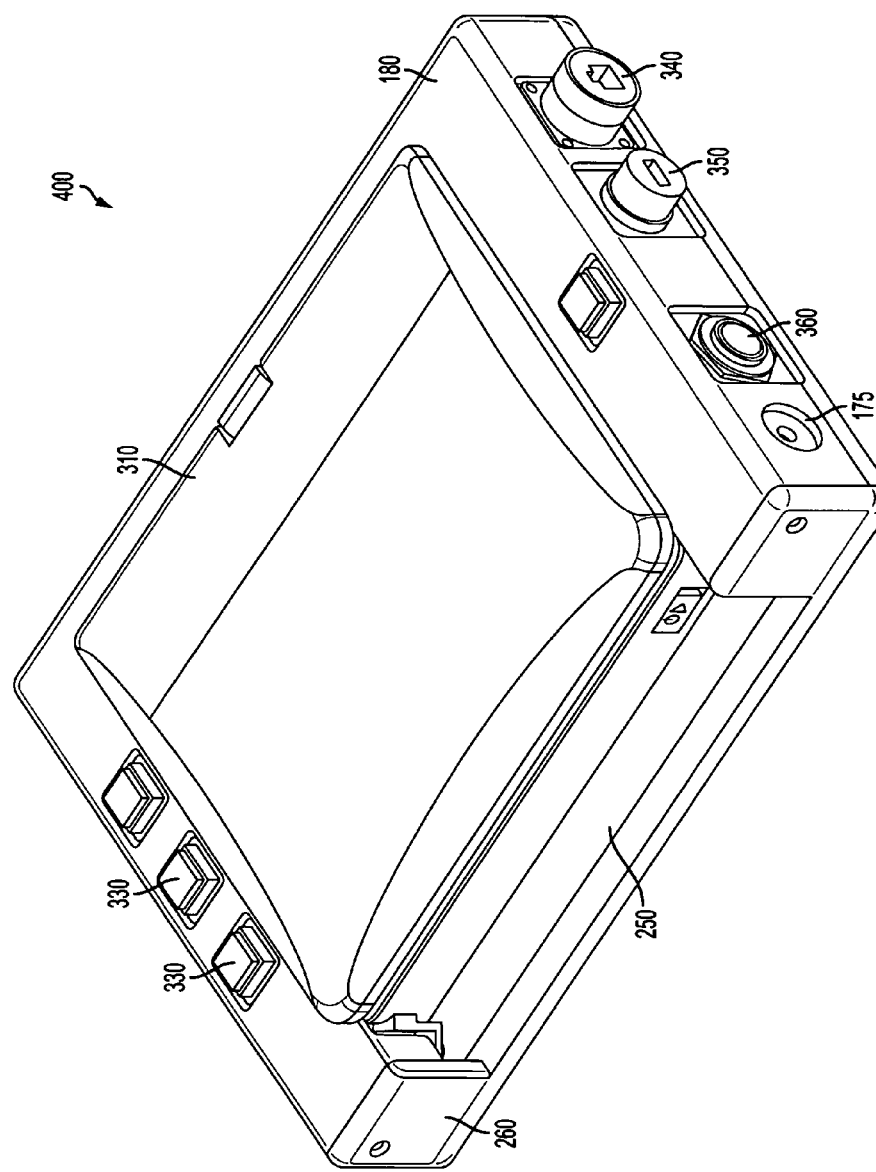
FIG. 4 is an isometric assembly view of the docking station.

FIG. 4 shows an isometric assembly view 400 of the complete IDS. The Toughdock 310 protrudes slightly above the top surface 180 of the upper portion 110 and bracketed by the plates 260 while supported by the base plate 250. The gun-fire buttons 350 protrude from their respective portholes 150 on the top surface 180. The connectors 340, 350 and 360 protrude from their respective portholes 160, 165 and 170 along the starboard arm 120.

In the early stages of developing the IDS for the CF-19 Toughdock 310, many commercial off-the-shelf (COTS) docking station designs were considered for the project. Although they provided the basic need of securing the laptop, the docks failed to include other criteria which are vital to military usage. A redesign of the IDS based on a commercial product was developed by NSWCDD. The ToughBook IDS was assigned various criteria to satisfy within its design.

In order to meet these criteria, extensive modifications were applied to previous docking models. In the initial approach, the initial dimensions and similar form of the previous model was maintained. However, the alterations incorporated improvements to facilitating access for maintenance as well as greater convenience in assembly and disassembly. A preliminary model demonstrated utility for numerous applications. With this dexterity, additional criteria were added to the design to be applied to other projects. The final design varied slightly to the preliminary model to achieve the following specifications: waterproof, mil-spec connections, cross program integration, drop test of four feet above ground, compatibility with a CF-19 ToughBook 310, as well as fire control switch integration for a gun weapons system.

The primary setback of this design was it was non-environmentally sealed, structurally weak, and poorly designed setup. The qualifications and goals applied in the design presented in this report were generated based primarily on cross project integration use. Various qualifications included waterproofing, military spec connections, survive a drop test of four feet, integration for gun fire control switches, and as mentioned previously, cross project integration.

The methodology for the design of the docking station used military specs along with a set of criteria it needed to meet. In addition, the design intended the station to be ergonomically productive in that the design of the docking station was not bulky, light weight, and easy to assemble. The criteria included the following:
- (a) environmentally sealed;
- (b) cross program integration;
- (c) easy maintenance access;
- (d) military specification connections;
- (e) ruggedized; and
- (f) integration for gun-fire control switches.

The finalized design for the docking station met all criteria as well as incorporated other non-demanding qualifications. On the starboard arm 120 are various mil spec connectors for various uses such as USB, Ethernet, ToughBook charger, etc. The CF-19 Toughbook 310 slides into place on the upper portion 110 and attaches via bolt holes placed on the underneath side of the lower portion 210. The CF-19 Toughbook 310 is mounted at the four extrudes supported by each L-foot 320. The connectors 340 and 350 are jam nut recaptacles and mount onto the side of the top plate. Each integrated gun-control button 330 for triggering is mounted by its own compression between the upper and lower portions 110 and 210 and through its corresponding porthole 150. The base plate 250 and the front plates 260 are secured to the upper portion 110 using 8-32 screws.

The electrical connections 340, 350, 360 and CF-19 Toughbook 310 are waterproof but the design of the docking station does allow for water to enter. In various exemplary embodiments, the IDS includes knife edges and grooves along with rubber seals in order to ensure no water seepage occurs so that the interior of the IDS remains completely waterproof. Other exemplary embodiments provide for alternate materials to comprise the frame, as well as various different connectors that can be attached to the frame composed of the upper and lower portions 110, 210.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A docking station for a laptop computer having access to at least one connector and at least one push button, said docking station comprising:

an upper portion having an aft bridge, a starboard arm and a port arm, each said arm having a lip, at least one of said arms having at least one cavity through a top surface for correspondently receiving the push button, and at least one of said arms having at least one orifice for correspondently receiving the connector; and a lower portion having an aft spine, a starboard side, a front spine and a port side that bound a base, said lower portion further having front plates at corner edges to said starboard and port sides, wherein the computer can be disposed on said base, the at least one push button corresponds to a weapon fire control switch, said upper portion is disposed on said lower portion such that each said lip aligns to said corresponding plate, and said upper and lower portions are secured by threaded screws from bottom corners of said lower portion into said upper portion and at said front plates to corresponding said lips.

2. The docking station according to claim 1, further comprising a plurality of communication interfaces disposed on said lower portion connectable to the computer.

3. The docking station according to claim 2, wherein said communication interfaces include at least one of a push button, an Ethernet connector, a USB connector and a power supply connector.

4. The docking station according to claim 2, wherein said communication interfaces include at least one push button disposed on said cavity and protruding through said upper portion towards said lower portion.

5. The docking station according to claim 2, wherein said communication interfaces include at least one of an Ethernet connector, a USB connector, and a power supply connector disposed along said starboard side of said lower portion and protruding through orifices of said starboard arm of said upper portion.

6. The docking station according to claim 1, further comprising a plurality of L-shape feet for securing the computer to said corners of said base.

7. The docking station according to claim 6, wherein said feet secure the computer to said base by screws.

8. The docking station according to claim 1, wherein the computer protrudes beyond a top surface of said upper portion.

* * * * *